(12) United States Patent
Yeo

(10) Patent No.: US 10,063,272 B1
(45) Date of Patent: Aug. 28, 2018

(54) PORTABLE DEVICE ATTACHMENT

(71) Applicant: Changki Yeo, Incheon (KR)

(72) Inventor: Changki Yeo, Incheon (KR)

( * ) Notice: Subject to any disclaimer, the term of this patent is extended or adjusted under 35 U.S.C. 154(b) by 0 days.

(21) Appl. No.: 15/549,967

(22) PCT Filed: Jun. 22, 2017

(86) PCT No.: PCT/KR2017/006581
§ 371 (c)(1),
(2) Date: Aug. 9, 2017

(87) PCT Pub. No.: WO2018/004192
PCT Pub. Date: Jan. 4, 2018

(30) Foreign Application Priority Data

Jun. 30, 2016  (KR) .......................... 10-2016-0082829

(51) Int. Cl.
  *A45F 5/00*    (2006.01)
  *H04B 1/3888*  (2015.01)
  *H04M 1/04*    (2006.01)

(52) U.S. Cl.
  CPC ............ *H04B 1/3888* (2013.01); *A45F 5/00* (2013.01); *H04M 1/04* (2013.01); *A45F 2005/008* (2013.01); *A45F 2200/0516* (2013.01)

(58) Field of Classification Search
  CPC ............... A45F 5/00; A45F 2200/0516; A45F 2005/008
  USPC ....................................................... 224/217
  See application file for complete search history.

(56) References Cited

U.S. PATENT DOCUMENTS

| 4,763,763 A * | 8/1988 | Sadow ................. A45C 13/26 150/108 |
| 8,374,657 B2 * | 2/2013 | Interdonato ............ H04B 1/385 379/433.07 |
| 8,550,317 B2 * | 10/2013 | Hyseni ..................... A45F 5/00 224/197 |
| 9,362,968 B1 * | 6/2016 | Haymond ............. H04B 1/385 |
| 9,793,941 B1 * | 10/2017 | Hirsch ................ H04B 1/3888 |
| 2011/0309117 A1 * | 12/2011 | Roberts ..................... A45F 5/00 224/217 |
| 2012/0048873 A1 * | 3/2012 | Hyseni ..................... A45F 5/00 220/752 |
| 2013/0119099 A1 * | 5/2013 | Interdonato ............ H04B 1/385 224/217 |

(Continued)

FOREIGN PATENT DOCUMENTS

| KR | 20-2013-0004431 U | 7/2013 |
| KR | 10-2015-0139119 A | 12/2015 |
| KR | 10-1629434 B1 | 6/2016 |

*Primary Examiner* — Justin Larson

(57) ABSTRACT

A portable device attachment includes an attachment pad, a strap, a stopping boss, and a strap guide. The strap is disposed on a side of the attachment pad, which is opposite to the attachment surface, to extend vertically and an upper end of the strap is fixed to an upper side of the attachment pad. The strap guide includes a pocket member fixed to the side of the attachment pad, a guide hole formed in the pocket member to guide upward and downward movement of the stopping boss, a lower stopping hole formed at a lower end of the guide hole to stop the stopping boss while the strap is unfolded, and an upper stopping hole formed at an upper end of the guide hole to strop the stopping boss while a central portion of the strap is bent after the lower side of the strap is pushed upwards.

5 Claims, 15 Drawing Sheets

(56) References Cited

U.S. PATENT DOCUMENTS

2017/0328514 A1\* 11/2017 Cavalcante ............... A45F 5/00

\* cited by examiner

PORTABLE DEVICE ATTACHMENT

CROSS REFERENCE PARAGRAPH

The present invention is a U.S. National Stage of PCT/KR2017/006581, filed Jun. 22, 2017, which claims the priority benefit of Korean Patent Application No. 10-2016-0082829, filed on Jun. 30, 2016, in the Korean Intellectual Property Office, the disclosures of which are incorporated herein by reference.

TECHNICAL FIELD

The present invention relates to a magic push that may be variously used in a portable terminal or the like.

BACKGROUND ART

Cellular phones, which correspond to a type of portable terminals, are widely used as one of personal communication means by which a user may perform voice communication and wireless communication while carrying them. In recent years, smartphones, tablet PCs, and the like, which are intelligent terminals that may perform Internet communication and a computer support function in addition to voice communication, have been mainly utilized.

Meanwhile, it is general for the user to use a portable terminal while gripping it. However, because a portable terminal, such as a smartphone, has a large width due to the large screen thereof, a user having a small hand may have a difficulty in manipulating the portable terminal while gripping it. When the user miss the portable terminal from the hand or accidentally collides with another person and drops the portable terminal while using it, the portable terminal may be damaged or broken down.

DETAILED DESCRIPTION OF THE INVENTION

Technical Problem

The present invention provides a portable device attachment that may increase convenience of a user by allowing the user to use it in various manners.

Technical Solution

In accordance with an aspect of the present invention, there is provided a magic push including an attachment pad having an attachment surface on one side thereof, a strap disposed on a side of the attachment pad, which is opposite to the attachment surface, to extend vertically and an upper end of which is fixed to an upper side of the attachment pad, a stopping boss disposed on the opposite side of the attachment pad while the strap is interposed between the stopping boss and the attachment pad and fixed to a lower end of the strap, and a strap guide including a pocket member fixed to the side of the attachment pad, which is opposite to the attachment surface to guide upward and downward movement of the strap while a lower side of the strap is inserted through an upper opening of the attachment pad, a guide hole formed in the pocket member to guide upward and downward movement of the stopping boss while the stopping boss is inserted into the guide hole, a lower stopping hole formed at a lower end of the guide hole to stop the stopping boss while the strap is unfolded side by side with the attachment pad; and an upper stopping hole formed at an upper end of the guide hole to strop the stopping boss while a central portion of the strap is bent after the lower side of the strap is pushed upwards.

Advantageous Effects of the Invention

According to the present invention, the portable terminal may be stably used while being gripped by the user. According to the present invention, the portable terminal may be used while being obliquely held on the bottom. According to the present invention, a holding angle of the portable terminal may be changed to a desired angle according to an attachment angle of a strap.

According to the present invention, the portable terminal may be held in the interior of a vehicle by a ring member, the magic push may be hung on a neck, or the magic push may be used as a key holder. Accordingly, convenience of the user may be enhanced by allowing the user to use the magic push in various manners.

BEST MODE

Figure 1:
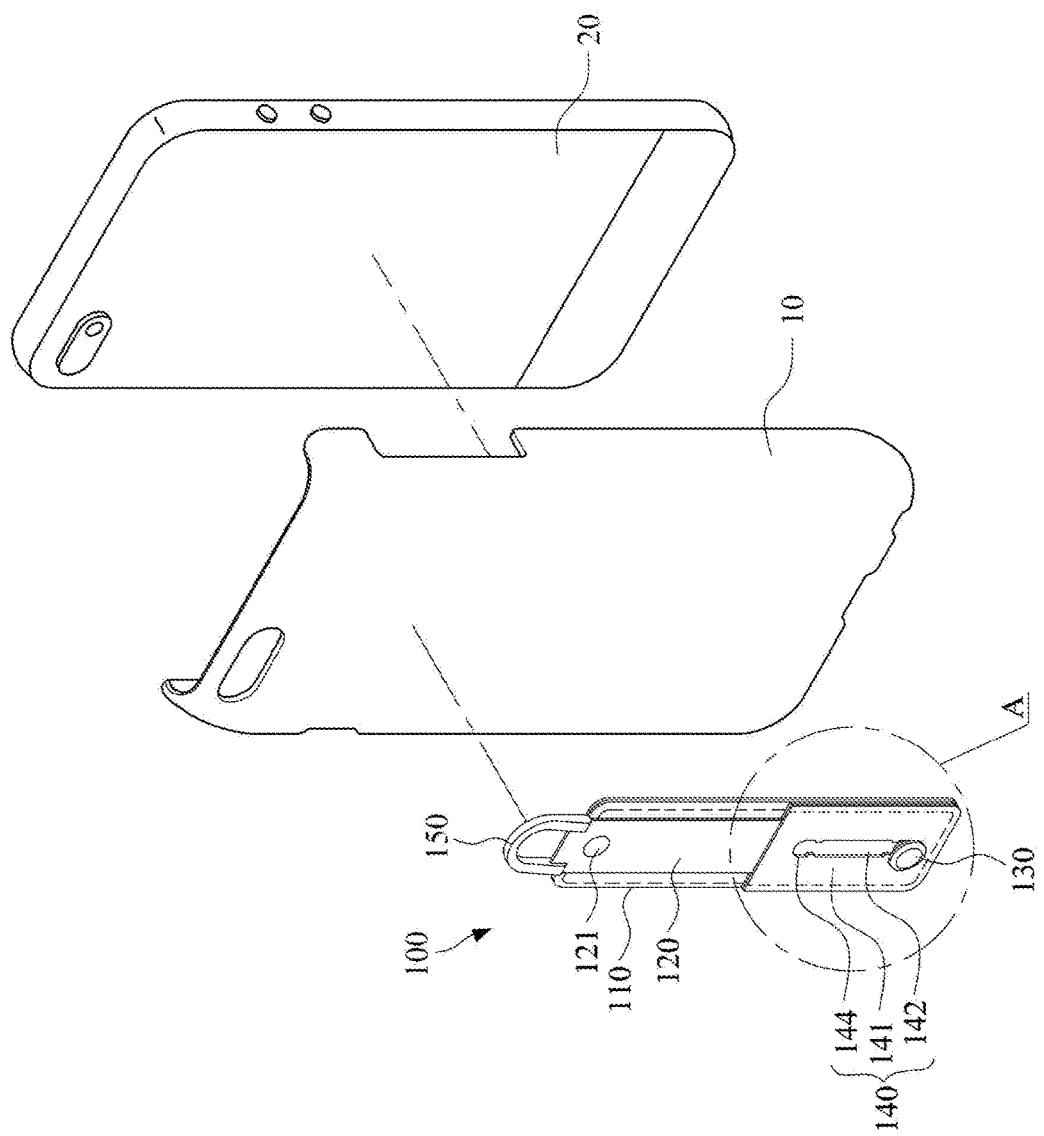
FIG. 1 is a perspective view of a magic push according to a first embodiment of the present invention.

Hereinafter, exemplary embodiments of the present invention will be described in detail with reference to the accompanying drawings. Here, the same reference numerals are given to the same configurations, and a repeated description and a detailed description of known functions and configurations that may make the essence of the present invention obscure will be omitted. The embodiments of the present invention are provided to describe the present invention for those skilled in the art more completely. Accordingly, in the drawings, the shapes and sizes of the elements may be exaggerated for clearer description.

Figure 2:
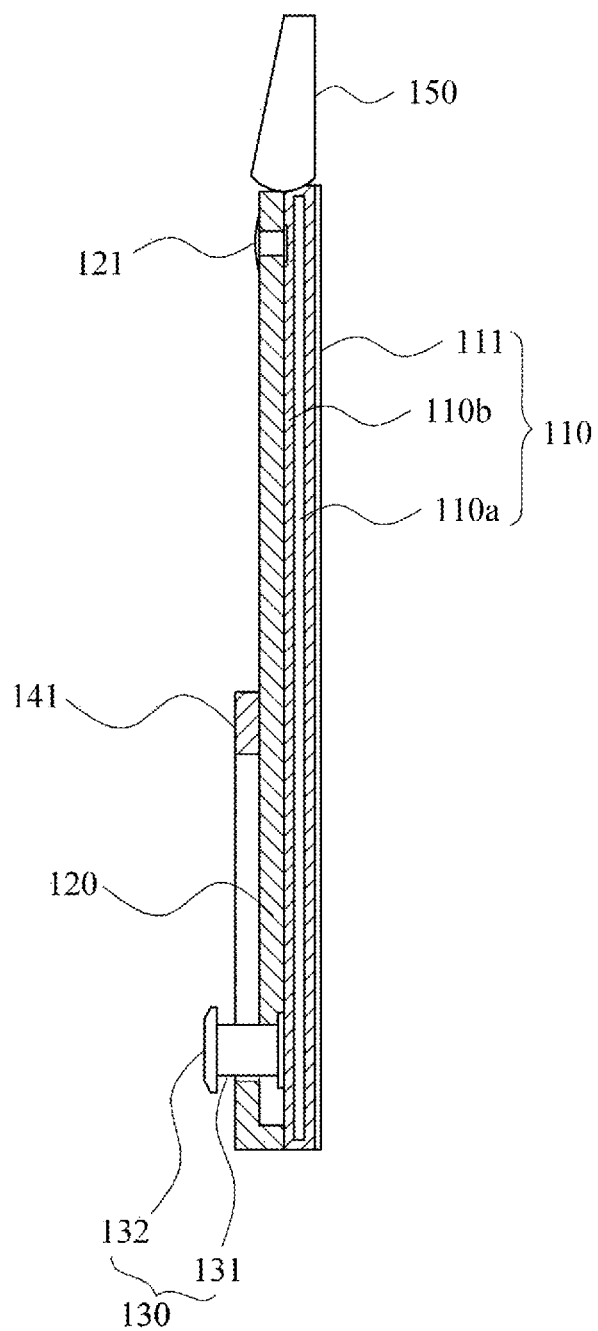
FIG. 2 is a sectional view of FIG. 1.
Figure 3:
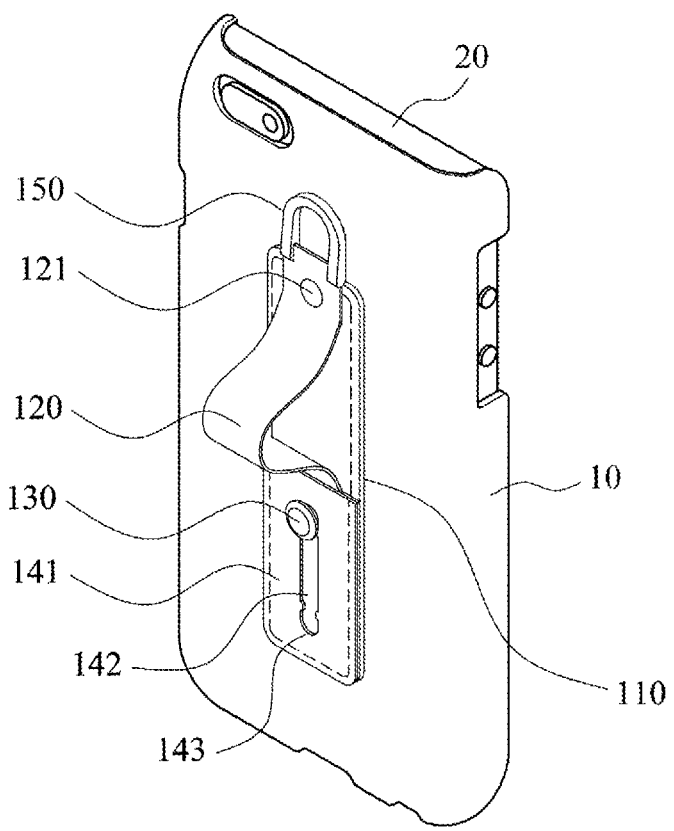
FIG. 3 is a perspective view illustrating a state in which a central portion of a strap is bent, in FIG. 1.
Figure 4:
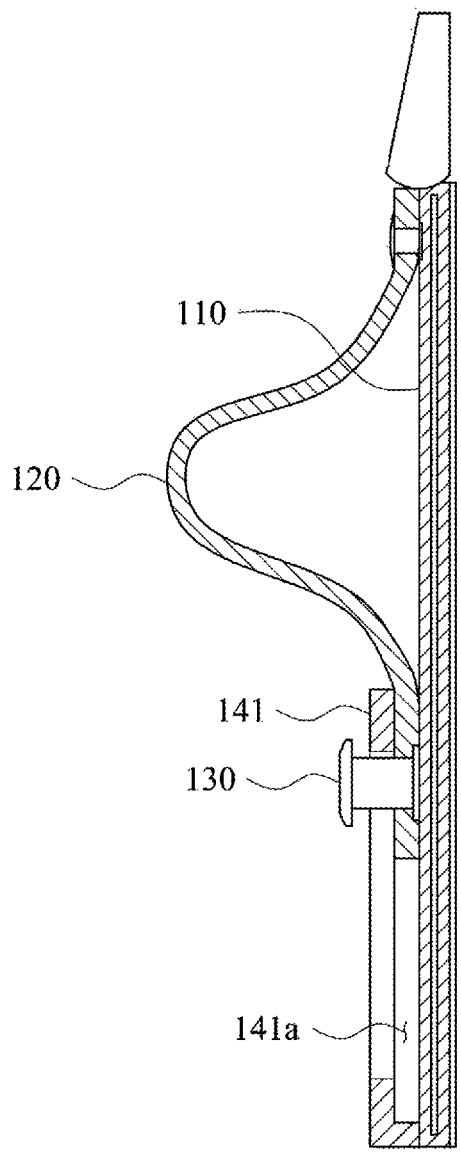
FIG. 4 is a sectional view of FIG. 3.
Figure 5:
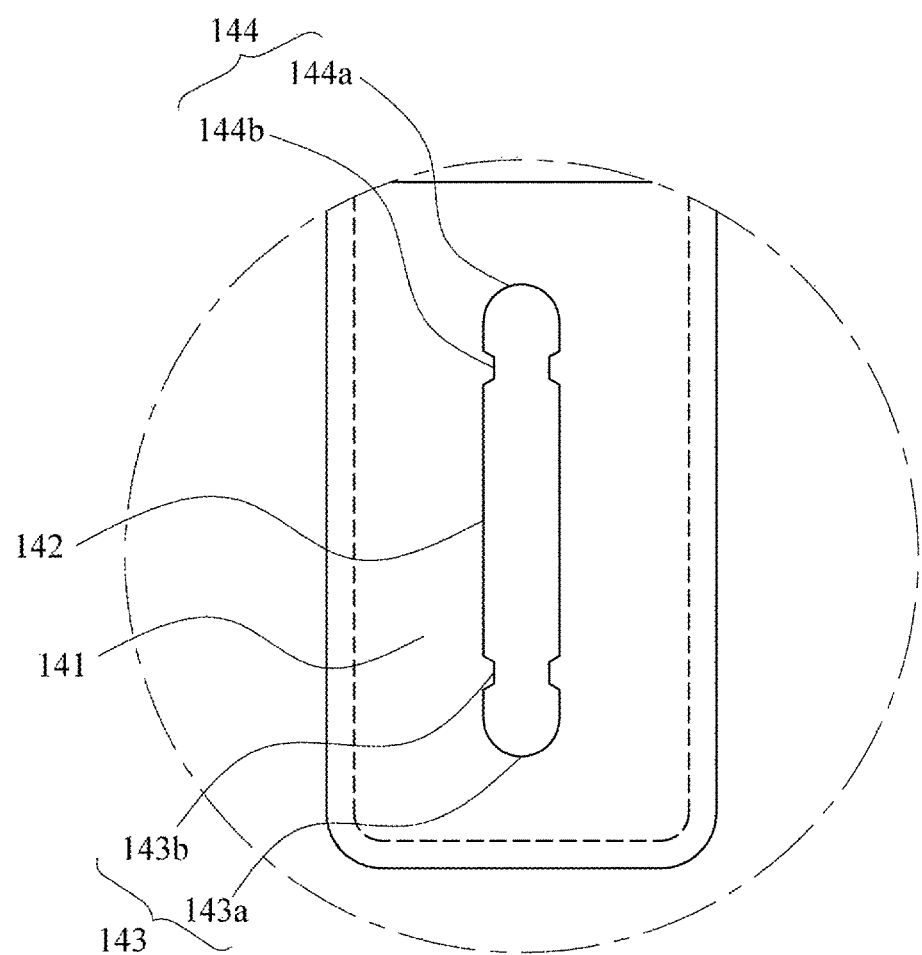
FIG. 5 is an enlarged view of area A of FIG. 1.

FIG. 1 is a perspective view of a portable device attachment, which is referred to as a magic push in the present disclosure, according to a first embodiment of the present invention. FIG. 2 is a sectional view of FIG. 1. FIG. 3 is a perspective view illustrating a state in which a central portion of a strap is bent, in FIG. 1. FIG. 4 is a sectional view of FIG. 3. FIG. 5 is an enlarged view of area A of FIG. 1.

Referring to FIGS. 1 to 5, the magic push 100 according to the first embodiment of the present invention includes an attachment pad 110, a strap 120, a stopping boss 130, and a strap guide 140.

The attachment pad 110 has an attachment surface on one side thereof. A bonding member 111, such as a double-sided table, may be bonded to the attachment surface of the attachment pad 110. The attachment pad 110 may be attached to a rear surface of a protection case 10 for a portable terminal by bonding an exposed bonding surface of the bonding member 111 to a rear surface of the protection case 10 for a portable terminal. The attachment pad 110 also may be attached to the rear surface of the portable terminal 20.

As another example, the attachment pad 110 may include a gel type bonding sheet instead of the bonding member 111. In this case, the attachment pad 110 may be easily attached to and detached from the protection case 10 for a portable terminal or the portable terminal 20.

The attachment pad 110 may be configured such that a core member 110a of a hard material is covered by an outer sheath 110b to maintain its shape. The outer sheath 110b may be formed of the same material as the strap 120. The attachment pad 110 may be formed of a material, such as soft plastic or metal. Further, although it is illustrated that the attachment pad 110 has a rectangular shape, the attachment pad 110 may have various shapes.

Although not illustrated, as another example, a permanent magnet may be embedded in the attachment pad 110. In this case, a magnetic metallic pad that may be attached to the permanent magnet with a magnetic force may be attached to a rear surface of the protection case 10 for a portable terminal or a rear surface of the portable terminal 20. When the permanent magnet is embedded in the attachment pad 110, the core member may be omitted.

The strap 120 is disposed on a side that is opposite to the attachment surface of the attachment pad 110 to extend vertically, and an upper end of the strap 120 is fixed to an upper side of the attachment pad 110. The upper side of the strap 120 may be fixed to the attachment pad 110 through a coupling means, such as a rivet 121. As another example, the upper side of the strap 120 may be fixed to the attachment pad 110 through sewing.

The strap 120 may be bent. The strap 120 may be formed of a leather material, but may be formed of a material, such as rubber, urethane, or silicon. The strap 120 may have a specific transverse width. The transverse width of the strap 120 may be smaller than the transverse width of the attachment pad 110. Meanwhile, the setting of the upward, downward, leftward, and rightward directions of the strap 120 is exemplary, and is not limited to the illustrated example.

The stopping boss 130 is disposed on a side that is opposite to the attachment pad 110 while the strap 120 is interposed therebetween, and is fixed to a lower end of the strap. The stopping boss 130 may include a boss body 131 and a boss head 132. One end of the boss body 131 passes through the strap 120 to be screw-coupled to a bolt, and thus may be fixed to the strap 120. The boss body 131 may have a cylindrical shape.

The boss head 131 is formed at an opposite end of the boss body 131 to have a cross-sectional area that is larger than that of the boss body 131. The boss head 132 may have a cylindrical shape, a diameter of which is larger than that of the boss body 132. Here, the boss head 132 may be concentric with the boss body 131. Corners of protruding ends of the boss head 132 may be chamfered.

The strap guide 140 includes a pocket member 141, a guide hole 142, a lower stopping recess 143, and an upper stopping hole 144. The pocket member 141 is fixed to a side of the attachment pad 110, which is opposite to the attachment surface of the attachment pad 110 to guide upward and downward movement of the strap 120 while a lower side of the strap 120 is inserted through an upper opening of the attachment pad 110. An upper end of the pocket member 141 is opened between the pocket member 141 and the attachment pad 110 and a lower end and left and right sides of the pocket member 141 may be closed. Accordingly, the pocket member 141 may have a pocket space 141a having an opened upper end between the pocket member 141 and the attachment pad 110. A lower end and left and right peripheries of the pocket member 141 may be fixed to the attachment pad 110 through sewing or the like. Of course, the pocket member 141 may be bonded to the attachment pad by an adhesive. Similarly to the strap 120, the pocket member 141 may be formed of various materials, such as a leather material, rubber, urethane, and silicon. The pocket member 141 may have a rectangular shape.

The pocket member 141 may have a transverse width that is larger than the transverse width of the strap 120 and is the same as the transverse width of the attachment pad 110. Accordingly, the transverse width of the pocket space 141a may be larger than the transverse width of the strap 120 so that a lower side of the strap 120 is smoothly moved in the pocket space 141a upwards and downwards. A guide hole 142 is formed in the pocket member 141 to guide upward and downward movement of the stopping boss 130 while the stopping boss 130 is inserted into the guide hole 142. The guide hole 142 may extend vertically while having a specific transverse width. The transverse width of the guide hole 142 may be smaller than the transverse width of the boss head 132, and may be the same as or larger than the transverse width of the boss body 131. Accordingly, the stopping boss 130 may be prevented from being separated when being inserted into the guide hole 142 to be moved upwards and downwards.

A lower stopping hole 143 is formed at a lower end of the guide hole 142 to stop the stopping boss 130 while the strap 120 is unfolded side by side with the attachment pad 110. The lower stopping hole 143 may include a seating hole 143a having a diameter that is the same as the diameter of the boss body 131, and a connection hole 143b having a width that is smaller than the diameter of the boss body 131 and extending from the seating hole 143a to be connected to the guide hole 142.

In this case, the boss body 131 may be inserted from the guide hole 142 to the seating hole 143a via the connection hole 143b. In this state, the boss body 131 may be stopped by the connection hole 143b and be maintained in the seating hole 143a in a locking manner. Accordingly, if the stopping boss 130 is stopped by the lower stopping hole 143, the strap 120 may continue to be unfolded side by side with the attachment pad 110.

The upper stopping hole 144 is formed at an upper end of the guide hole 142 to stop the stopping boss 130 while a central portion of the strap 120 is bent after a lower side of the strap 120 is pushed upwards. The upper stopping hole 144 may have the same shape as the lower stopping hole 143. The seating hole 144a and the connection hole 144b of the upper stopping hole 144 may have the same shapes as the seating hole 143a and the connection hole 143b of the lower stopping hole 143.

The upper stopping hole 144 is disposed on a side that is opposite to the lower stopping hole 143 while the guide hole 142 is interposed therebetween. Here, the upper stopping hole 144 is symmetrical to the lower stopping hole 143 with respect to the guide hole 142. Accordingly, if the stopping boss 130 is stopped by the upper stopping hole 144, a central portion of the strap 120 continues to be bent.

Meanwhile, the magic push 100 may further include a ring member 150. The ring member 150 may be coupled to an upper end of the strap 120. The ring member 150 may be inserted into and coupled to the connection hole of the upper end of the strap 120 to be rotated about the strap 120. Accordingly, it is illustrated that the ring member 150 has a D shape, the ring member 150 may have various shapes.

The usages of the above-described magic push 100 will be described with reference to FIGS. 6 to 12, together with FIGS. 1 to 5. Here, although it is illustrated that the magic push 100 is attached to a rear surface of the protection case 10 for a portable terminal, the same scheme may be used even when the magic push 100 is attached to the portable terminal 20.

First, as illustrated in FIG. 1, the magic push 100 is attached to the rear surface of the protection case 10 for a portable terminal through the attachment pad 110 by the user. Further, the stopping boss 130 is stopped by the lower stopping hole 143, and the strap 120 is unfolded side by side with the attachment pad 110.

Figure 6:
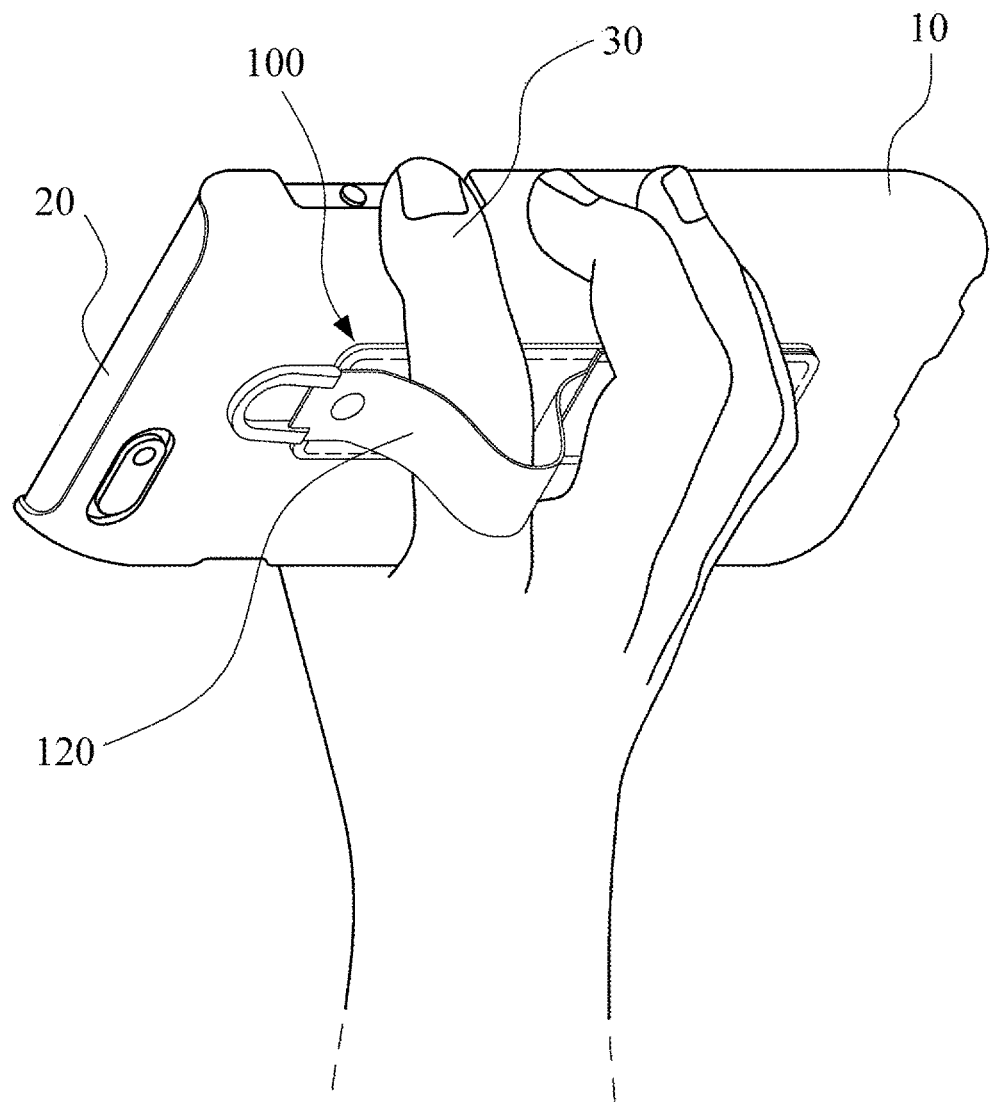
FIGS. 6 to 11 are views illustrating various usages of the magic push of FIG. 1.

In this state, as illustrated in FIG. 3, the user pushes the stopping boss 130 to the upper stopping recess 144 along the guide hole 142 such that the stopping boss 130 is stopped by the upper stopping recess 144. In this process, a lower side of the strap 120 is moved upwards in the pocket space 141a of the pocket member 141, and accordingly, a central portion of the strap 120 is bent convexly from an opposite side of the attachment pad 110, which is opposite to the attachment surface, to create a ring shaped space. Then, as illustrated in FIG. 6, because the user may grip the protection case 10 for a portable terminal while hanging a finger 30 in the ring-shaped space of the strap 120, the portable terminal 20 mounted on the protection case 10 for a portable terminal may be stably gripped by one hand.

Thereafter, if it becomes not necessary to use the strap 120 in the above-mentioned form any more, as illustrated in FIG. 1, the user pushes the lower stopping recess 143 along the guide hole 142 and stops the lower stopping recess 143. In this process, the lower side of the strap 120 is moved downwards in the pocket space 141a of the pocket member 141, and accordingly, the central portion of the strap 120 continue to be unfolded side by side with the attachment pad 110.

Figure 7:
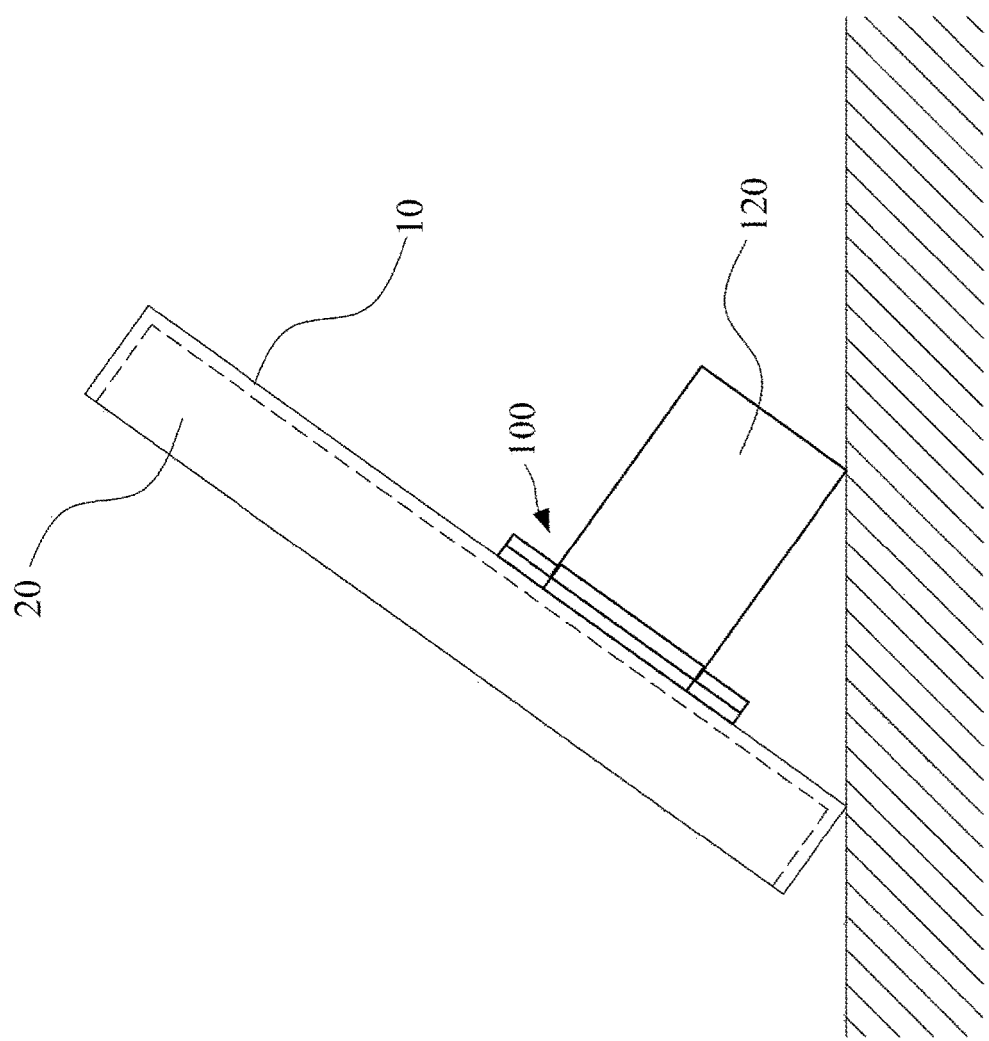
Figure 8:
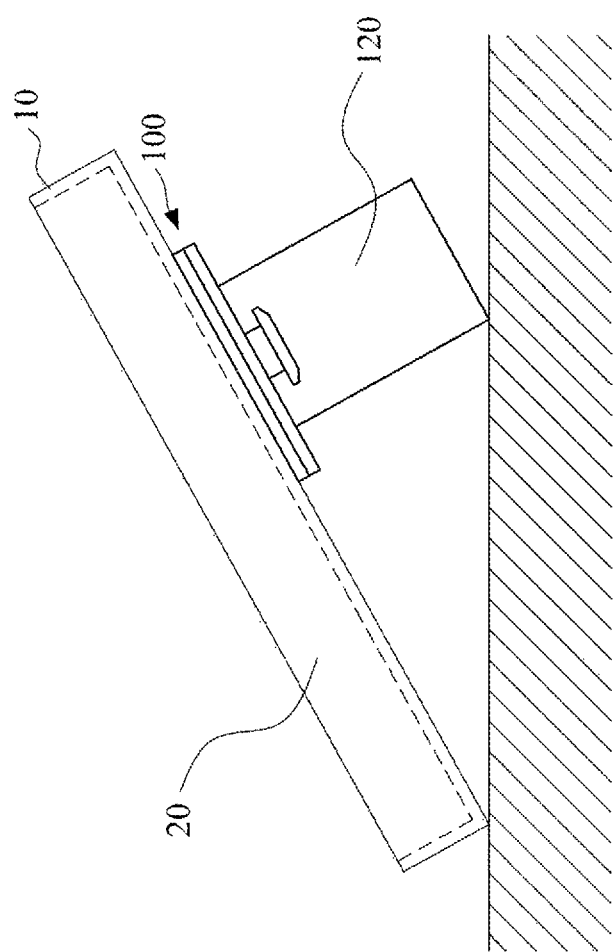

As another example, as illustrated in FIGS. 7 and 8, if the user changes the shape of the central portion of the strap 120 into a ring shape and positions the strap 120 on the bottom, the strap 120 may function as a stand that holds the portable terminal 120 while the portable terminal 120 is inclined. Then, the magic push 100 may be biased to one side with respect to a vertical central line of the protection case 10 for a portable terminal by the user and may be attached to the protection case 10 for a portable terminal.

In this case, while the left and right sides of the magic push 100 is laid upwards and downwards, the holding angle of the portable terminal 20 may become different according to on which sides of the magic push 100 the user positions on the bottom. Further, the holding angle of the portable terminal 20 may be different according to a location at which the user attaches the magic push 100 to the protection case 10 for a portable terminal. Accordingly, the user may change the holding angle of the portable terminal 20 to a desired angle.

Figure 9:
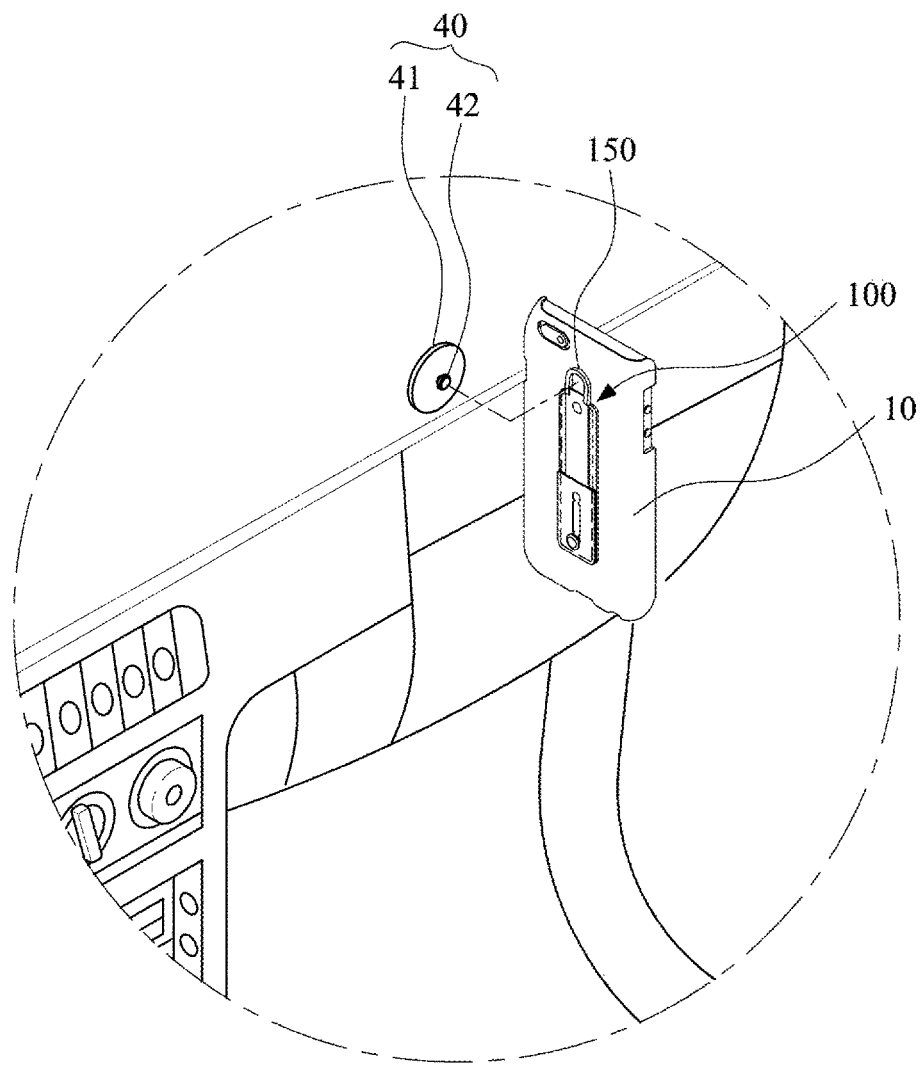

As another example, as illustrated in FIG. 9, when the magic push 100 includes the ring member 150, the user may hang the magic push 100 in the interior of the vehicle by using the ring member 150. To achieve this, a holder 40 may be attached to the interior of the vehicle. The holder 40 includes a holder pad 41 and a holder boss 42. The holder pad 41 may be attached to the interior of the vehicle by using a bonding member. The holder boss 42 has the same shape as the stopping boss 130 and may be fixed to the holder pad 41.

Because the magic push 100 may be hung on the holder 40 if the user hangs the ring member 150 on the holder boss 42, the portable terminal 20 may be held in the interior of the vehicle. Because the magic push 100 may be separated from the holder 40 if the user separates the ring member 150 from the holder boss 42, the portable terminal 20 may be released from the holding state in the interior of the vehicle.

Figure 10:
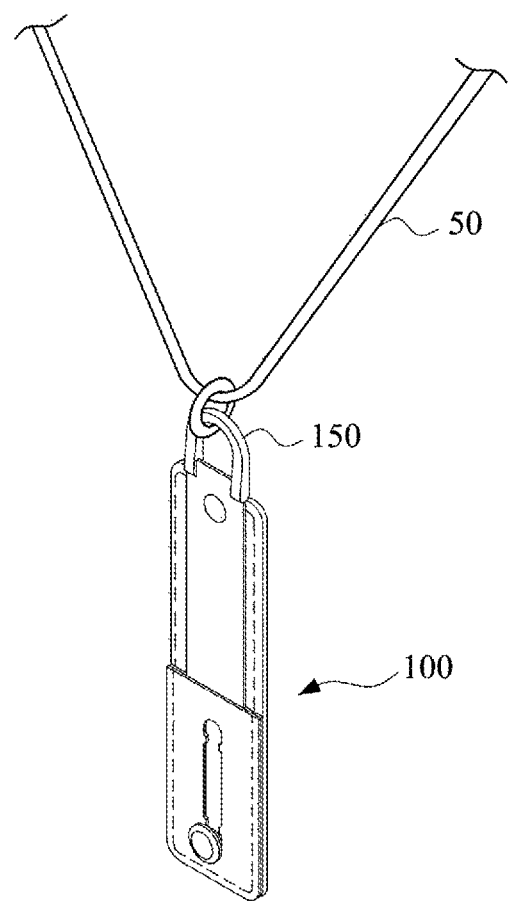

As another example, as illustrated in FIG. 10, the user may insert the necklace strap 50 into the ring member 150. Accordingly, the user may use the portable terminal 20 after hanging the portable terminal 20 on a neck by using the strap 50.

Figure 11:
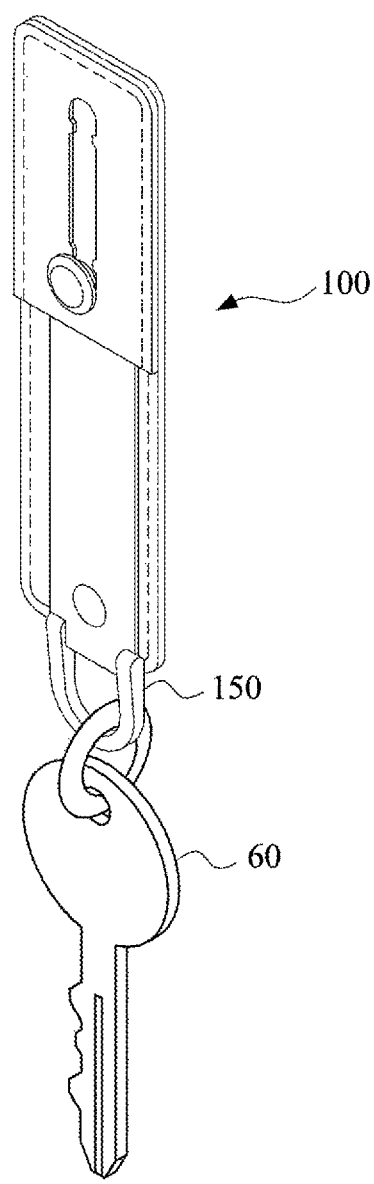

As another example, as illustrated in FIG. 11, the magic push 100 may be used as a key holder by inserting a key 60 into the ring member 150. In this case, the attachment pad 110 includes a gel type bonding sheet or a permanent magnet so that the magic push 100 may be attached to and detached from a refrigerator or the like. Further, the magic push 100, into which the key 60 is inserted, may be held in the interior of the vehicle.

Figure 12:
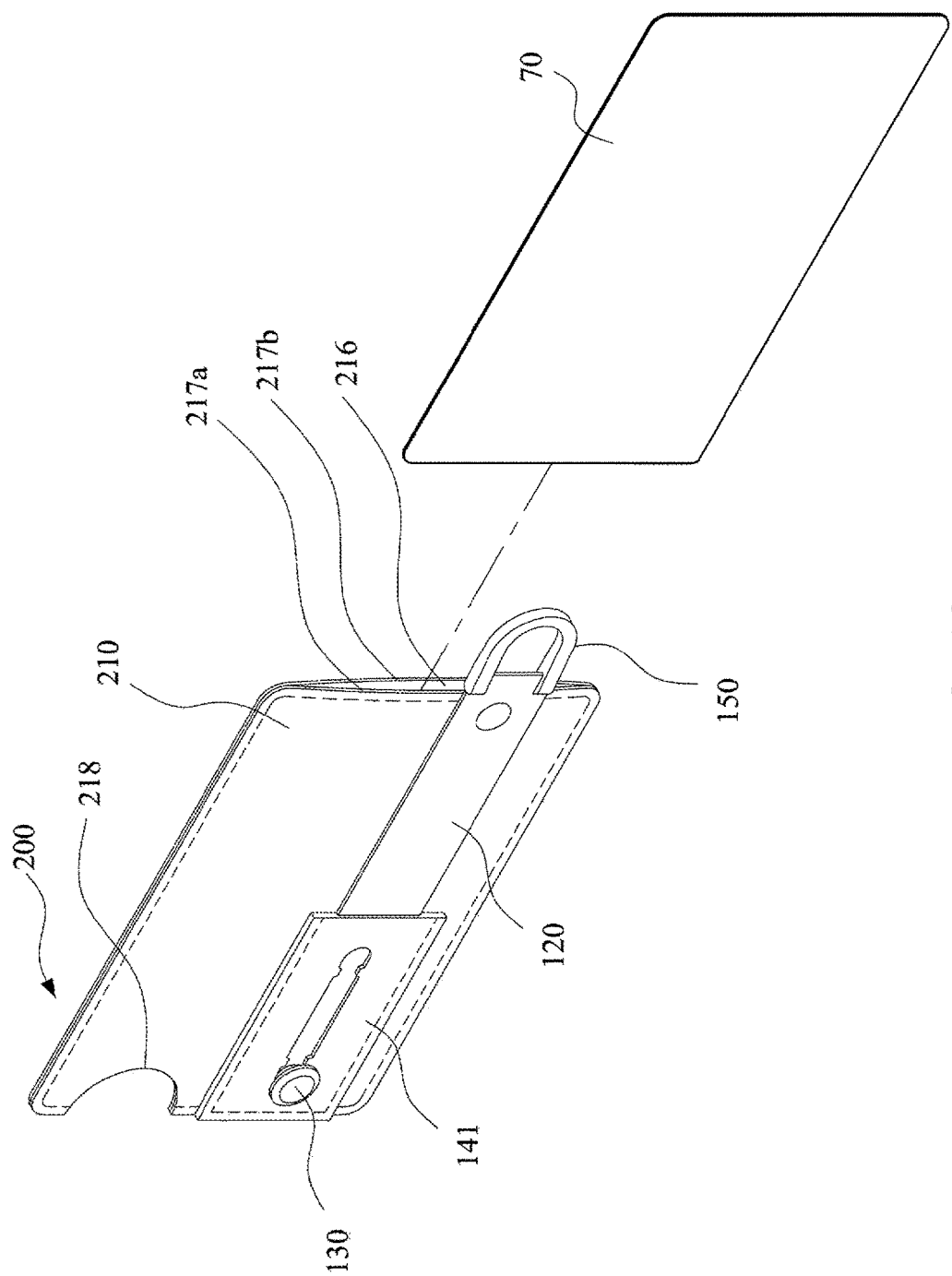
FIG. 12 is a perspective view of a magic push according to a second embodiment of the present invention.
Figure 13:
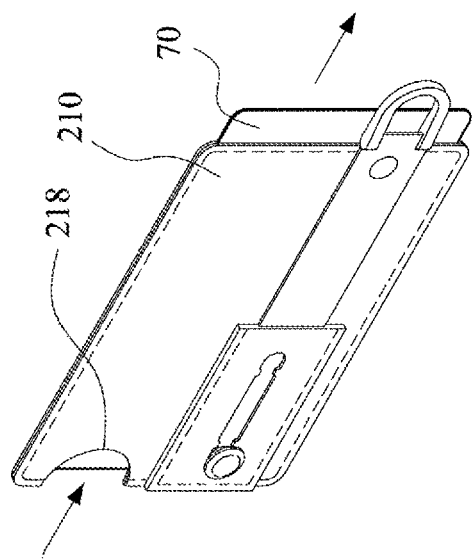
FIG. 13 is a perspective view illustrating a process of receiving and extracting a card into and from a card reception hole of an attachment pad in FIG. 12.
Figure 14:
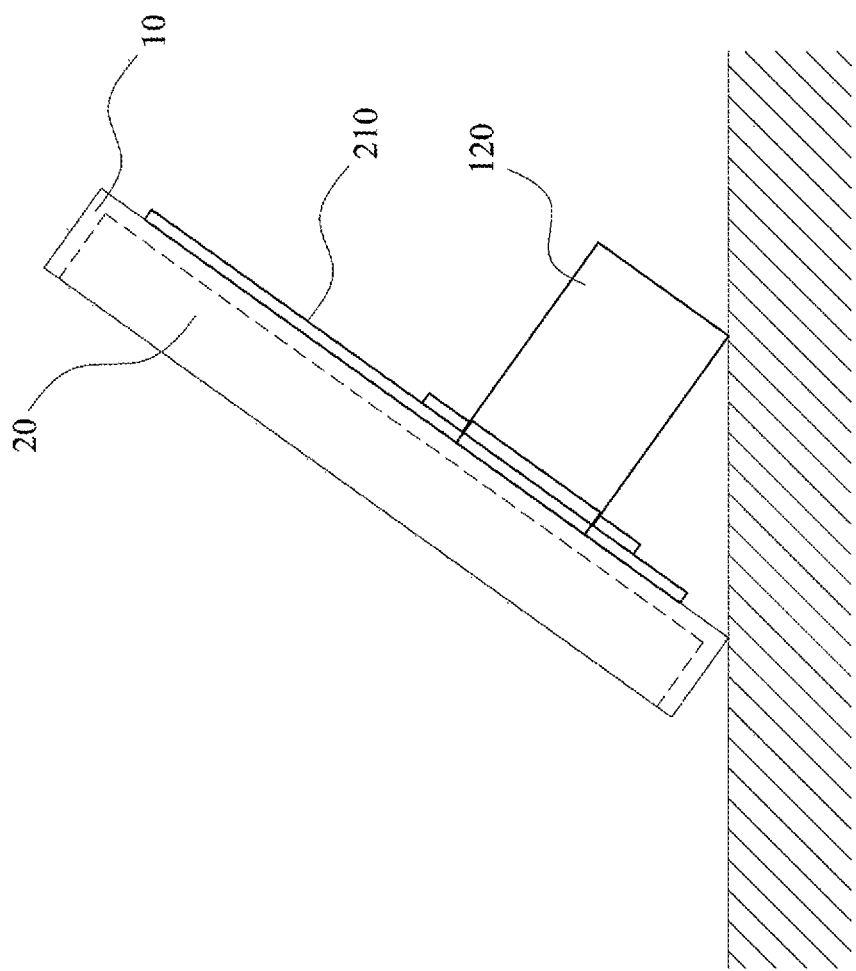
FIGS. 14 and 15 are views illustrating examples of holding a portable terminal by the magic push of FIG. 12.
Figure 15:
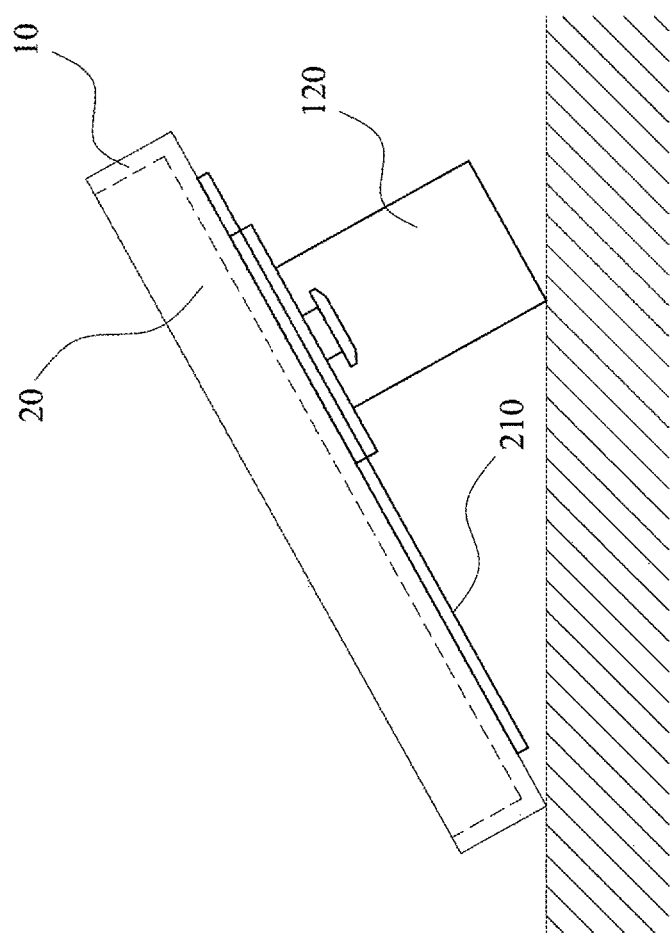

FIG. 12 is a perspective view of a magic push according to a second embodiment of the present invention. FIG. 13 is a perspective view illustrating a process of receiving and extracting a card into and from a card reception hole of an attachment pad in FIG. 12. FIGS. 14 and 15 are views illustrating examples of holding a portable terminal by the magic push of FIG. 12.

Referring to FIG. 12, in the magic push 200 according to the second embodiment of the present invention, the attachment pad 210 has a transverse width that is larger than the transverse width of the pocket member 141. Accordingly, the attachment pad 210 may be stably attached to the rear surface of the protection case 10 for a portable terminal or the portable terminal 20 with an increased attachment area.

The attachment pad 210 may have a transverse width that is larger than the transverse width of the card 70, and may have a longitudinal length that is larger than the longitudinal length of the card 70. In this case, the attachment card 210 may include a card reception hole 216 that receives the card 70.

For example, the attachment pad 210 may includes two sheet members 217a and 217b, each of which has an opened upper end and a lower end and left and right peripheries of which are coupled to each other to be closed. Here, the lower ends and the left and right peripheries of the sheet members 217a and 217b may be coupled to each other through sewing. Of course, the sheet members 217a and 217b may be bonded to each other by using an adhesive. The interior space between the sheet members 217a and 217b forms the card reception hole 216.

The attachment pad 210 may have a cutaway recess 218 at a portion of a lower end thereof. The cutaway recess 218 communicates with the card reception hole 216. The cutaway recess 218 may have a semicircular shape. As illustrated in FIG. 13, the user may easily extract the card 70 from the card reception hole 216 by pushing the card 70 upwards through the cutaway recess 218 while the card 70 is received in the card reception hole 216.

The strap 120 may be biased to one side with respect to a vertical central line of the attachment pad 210. In this case, as illustrated in FIGS. 14 and 15, while the left and right sides of the strap 120 is laid upwards and downwards, the holding angle of the portable terminal 20 in the protection case 10 for a portable terminal may become different according to on which sides of the strap 120 the user positions on the bottom. Accordingly, the user may change the holding angle of the portable terminal 20 to a desired angle.

Although an embodiment of the present invention has been described with reference to the accompanying drawings, it is simply exemplary and it may be understood by those skilled in the art that various modifications and equivalent embodiments are possible. Accordingly, the genuine protection scope of the present invention shall be determined only by the attached claims.

INDUSTRIAL APPLICABILITY

The magic push according to the present invention may be attached to a portable terminal so that the portable terminal may be safely carried and may be positioned on the bottom in an upright posture.

The invention claimed is:

1. A portable device attachment comprising:
 a portable device attachment having an attachment surface on one side thereof;
 a strap disposed on a side of the attachment pad, which is opposite to the attachment surface, to extend vertically and an upper end of which is fixed to an upper end of the attachment pad;
 a stopping boss disposed on the opposite side of the attachment pad while the strap is interposed between the stopping boss and the attachment pad and fixed to a lower end of the strap; and
 a strap guide including a pocket member fixed to the side of the attachment pad, which is opposite to the attachment surface, to guide upward and downward movement of the strap while a lower side of the strap is inserted through an upper opening of the attachment pad, a guide hole formed in the pocket member to guide upward and downward movement of the stopping boss while the stopping boss is inserted into the guide hole, a lower stopping hole formed at a lower end of the guide hole to stop the stopping boss while the strap is unfolded side by side with the attachment pad, and an upper stopping hole formed at an upper end of the guide hole to stop the stopping boss while a central portion of the strap is bent after the lower side of the strap is pushed upwards.

2. The portable device attachment of claim 1, wherein the attachment pad has a transverse width that is larger than a transverse width of the pocket member.

3. The portable device attachment of claim 2, wherein the strap is biased to one side with respect to a vertical central line of the attachment pad.

4. The portable device attachment of claim 2, wherein the attachment pad includes a card reception hole configured to receive a card.

5. The portable device attachment of claim 1, further comprising:
 a ring member coupled to an upper end of the strap.

* * * * *